United States Patent
Wang et al.

(10) Patent No.: US 10,324,369 B2
(45) Date of Patent: Jun. 18, 2019

(54) METHODS FOR GENERATING A MANDREL MASK

(71) Applicant: Taiwan Semiconductor Manufacturing Co., Ltd., Hsinchu (TW)

(72) Inventors: Tsung-Yu Wang, Hsinchu (TW); Nian-Fuh Cheng, Hsinchu (TW); Chia-Ping Chiang, Taipei (TW); Ming-Hui Chih, Luzhou (TW); Wen-Chun Huang, Tainan (TW); Tsai-Sheng Gau, Hsinchu (TW)

(73) Assignee: TAIWAN SEMICONDUCTOR MANUFACTURING CO., LTD., Hsinchu (TW)

(*) Notice: Subject to any disclaimer, the term of this patent is extended or adjusted under 35 U.S.C. 154(b) by 2 days.

(21) Appl. No.: 15/686,955

(22) Filed: Aug. 25, 2017

(65) Prior Publication Data
US 2019/0064652 A1   Feb. 28, 2019

(51) Int. Cl.
G06F 17/50   (2006.01)
G03F 1/36   (2012.01)
H01L 21/308   (2006.01)
H01L 29/66   (2006.01)

(52) U.S. Cl.
CPC .......... *G03F 1/36* (2013.01); *G06F 17/5068* (2013.01); *H01L 21/3086* (2013.01); *H01L 29/66795* (2013.01); *G06F 2217/12* (2013.01)

(58) Field of Classification Search
CPC ........................................................ G03F 1/36
USPC .......................................................... 716/55
See application file for complete search history.

(56) References Cited

U.S. PATENT DOCUMENTS

| | | | |
|---|---|---|---|
| 8,381,152 B2 | 2/2013 | Lai et al. | |
| 8,799,833 B2 * | 8/2014 | Wann | G06F 17/5068 430/30 |
| 8,826,193 B1 * | 9/2014 | Du | G03F 1/70 716/51 |
| 2012/0137261 A1 * | 5/2012 | Ban | G06F 17/5068 716/52 |
| 2012/0278781 A1 * | 11/2012 | Wann | G06F 17/5068 716/122 |
| 2012/0329267 A1 * | 12/2012 | Horak | H01L 21/76885 438/627 |
| 2013/0313615 A1 * | 11/2013 | Tzeng | H01L 27/0207 257/206 |
| 2014/0210100 A1 | 7/2014 | Xiao et al. | |
| 2014/0237435 A1 | 8/2014 | Chen et al. | |
| 2017/0017745 A1 | 1/2017 | Wang et al. | |

* cited by examiner

*Primary Examiner* — Suresh Memula
(74) *Attorney, Agent, or Firm* — McDermott Will & Emery LLP

(57) ABSTRACT

Embodiments of the present disclosure provide a method of generating mandrel patterns. A mandrel pattern is generated by constructing a boundary box, initiating a plurality of lead mandrels, and extending the lead mandrels across the boundary box. When a pattern region includes holes, portions of mandrels are removed from the holes after extension of the leading mandrels.

19 Claims, 9 Drawing Sheets

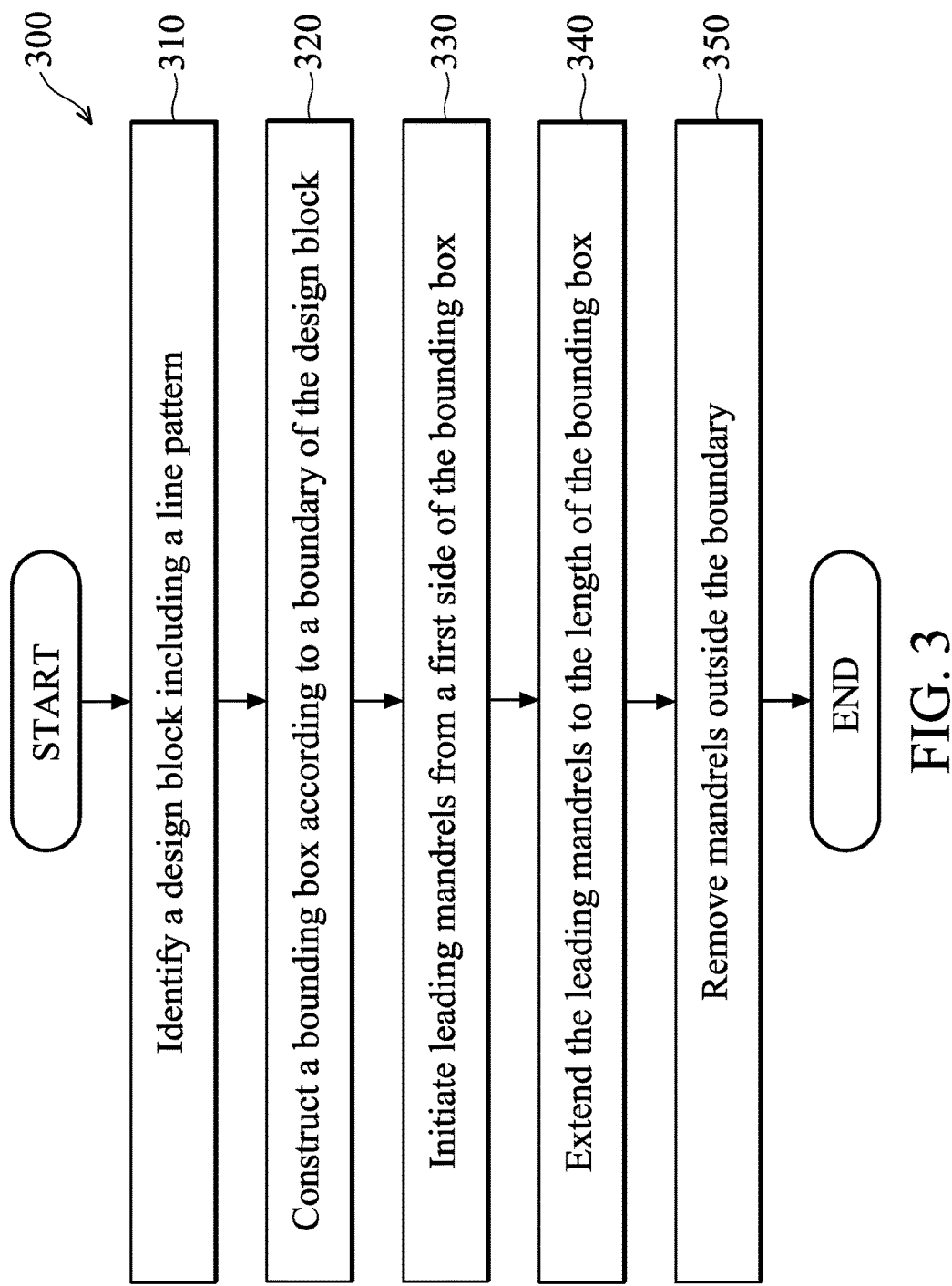

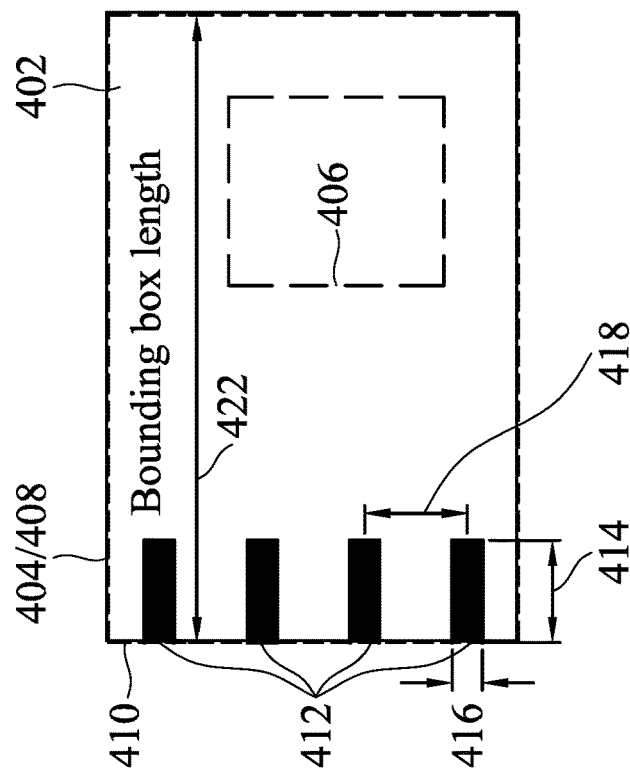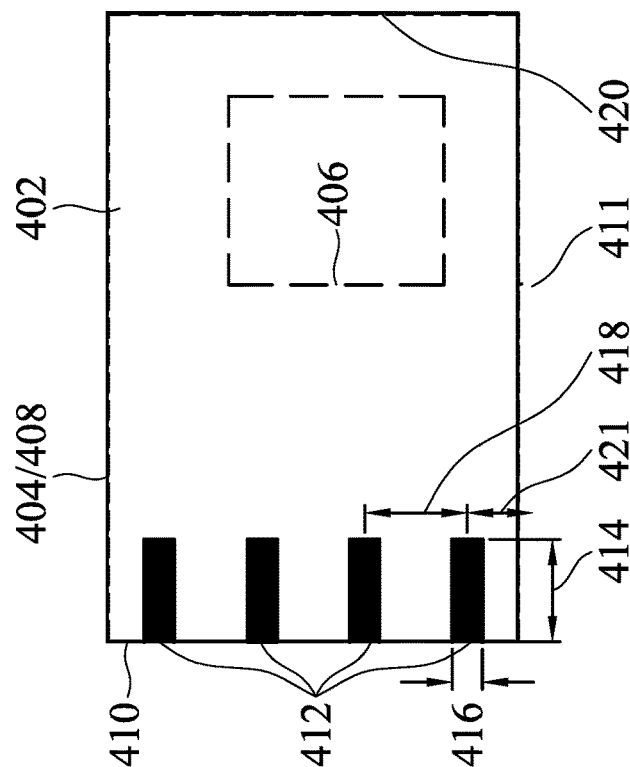

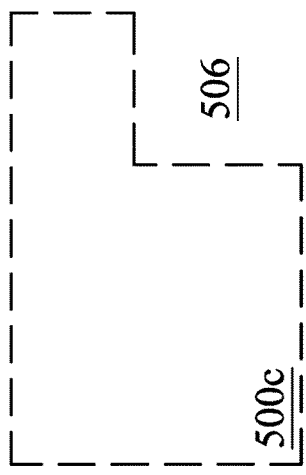
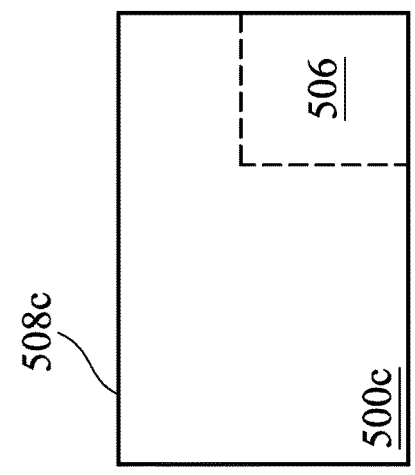
FIG. 5A
FIG. 5B

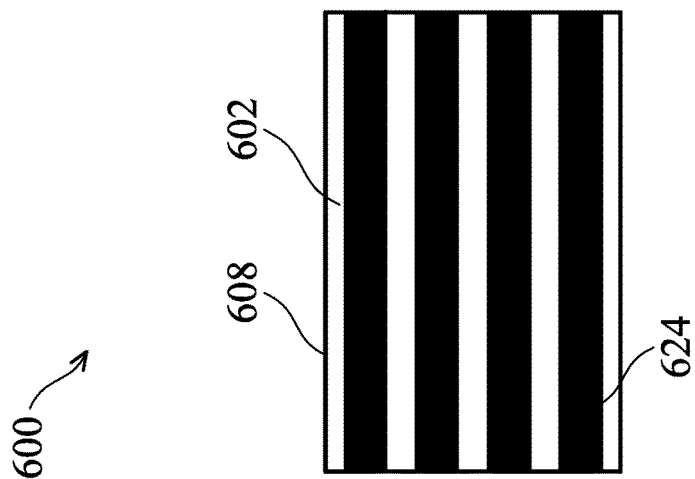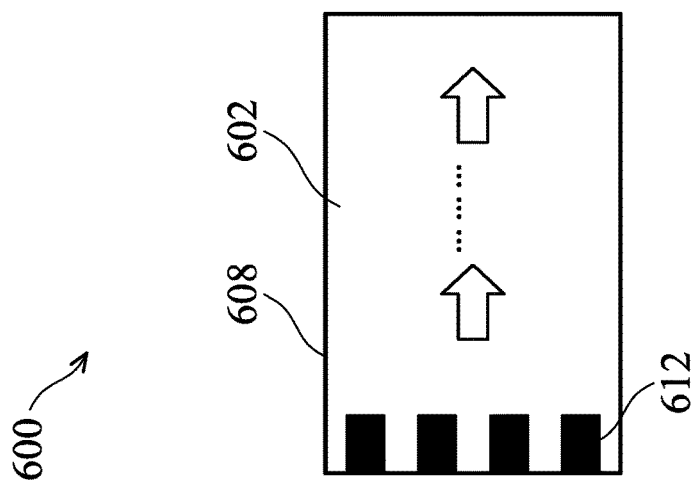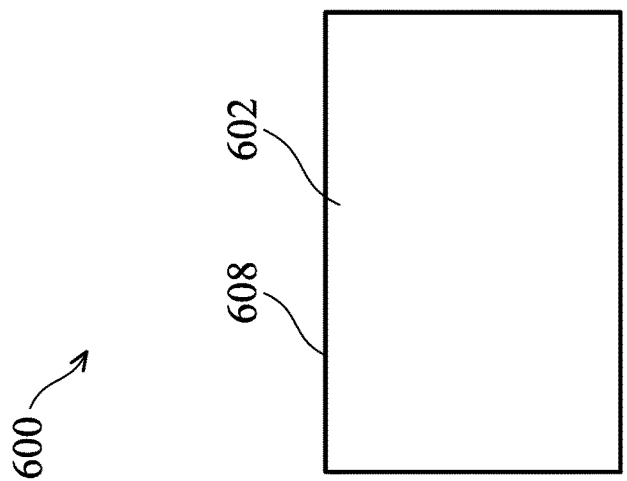

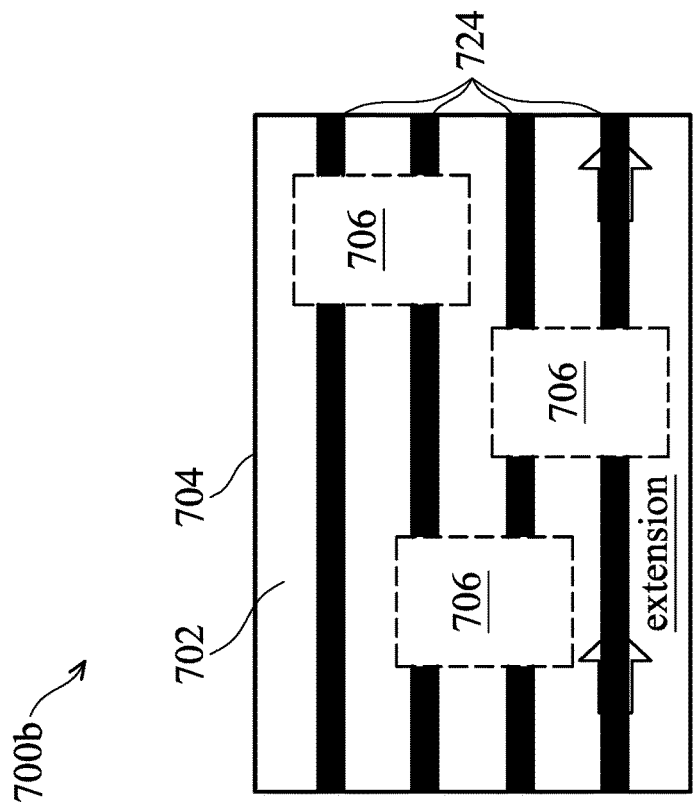
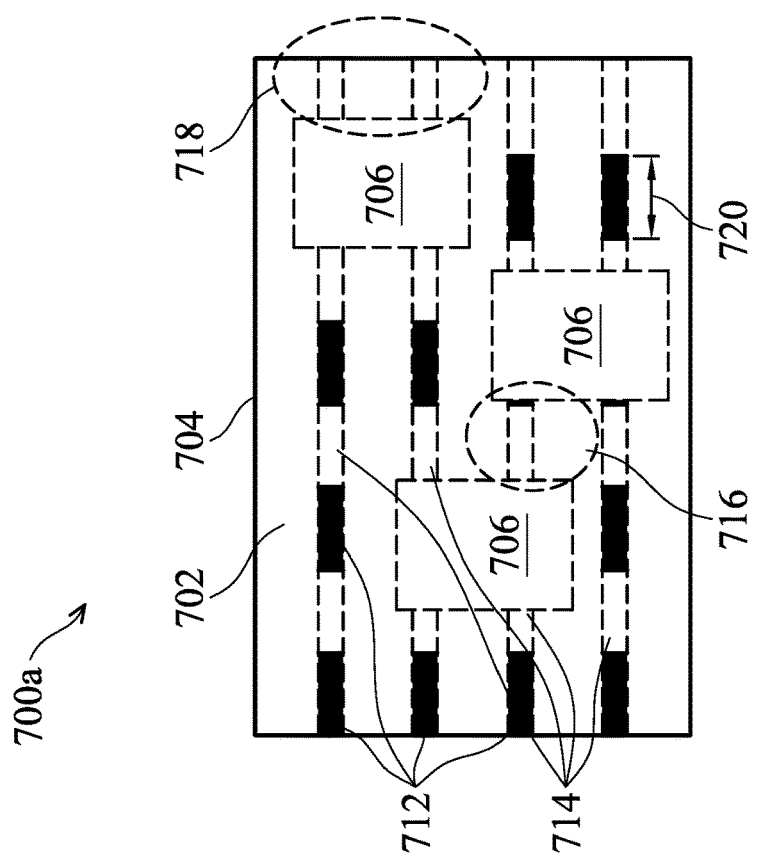
FIG. 7B
FIG. 7A

METHODS FOR GENERATING A MANDREL MASK

BACKGROUND

As integrated circuits (IC) have become smaller and more complex, IC designers use electronic design automation (EDA) software tools to design integrated circuits. Typically, the integrated circuit design process begins with a specification, which describes the functionality of the integrated circuit and may include a variety of performance requirements. Then, during a logic design phase, the logical implementation of the IC functionality is described using one of several hardware description languages such as Verilog or VHDL at the register transfer logic (RTL) level of abstraction. Typically, the EDA software tool synthesizes the abstract logic into a technology dependent netlist using a standard library from an IC manufacturer. The RTL can also describe the behavior of the circuits on the chip, as well as the interconnections to inputs and outputs.

After completion of the logic design phase, the IC undergoes a physical design phase. The physical design phase creates a semiconductor chip design from the RTL design and a library of available logic gates, and includes determining which logic gates to use, defining locations for the logic gates and interconnecting the logic gates. The physical design phase outputs design layouts.

After a design layout is prepared, masks for use in fabrication of the IC are generated using mask preparation tools. In advanced nodes production, such as 10 nm nodes and 5 nm nodes, layout designs may include features distributed in irregular regions to satisfy complicated functionality. For example, fin features can be formed in a donut shaped region. It takes a long time to generate masks for layout designs in advanced nodes production using traditional mask generating methods. Sometimes, pattern features may be missed from the mask pattern.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a schematic flow chart of a method of generating mandrel patterns according to one embodiment of the present disclosure.

FIG. 4A-4F are schematic plane views of a design block showing a process of feature generation using the method of FIG. 3.

FIG. 5A includes schematic plane views of design blocks in various shape.

FIG. 5B includes schematic plane views of design blocks in various shape.

FIGS. 6A-6C are schematic plane views of a rectangular design block showing a process of feature generation using the method of FIG. 3.

FIG. 7A is a schematic plane view of a design block with fin features generated using a traditional method.

FIG. 7B is a schematic plane view of a design block with fin features generated using a method according to one embodiment of the present disclosure.

DETAILED DESCRIPTION

Figure 1:
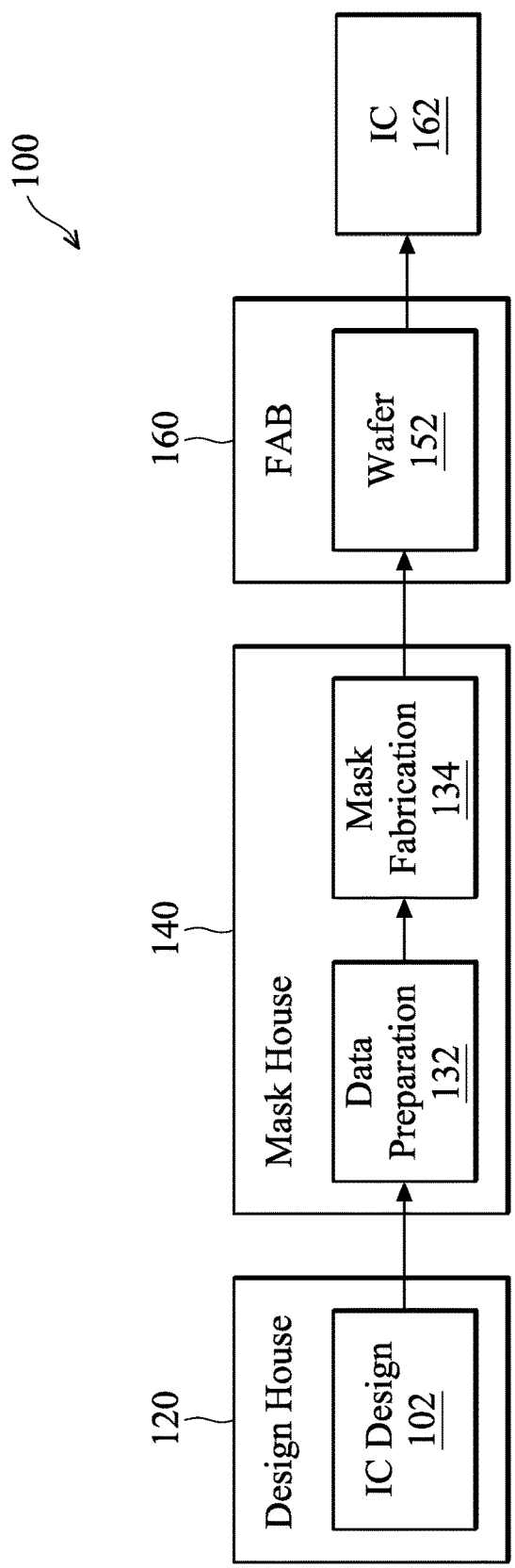
FIG. 1 is a schematic block diagram of an integrated circuit (IC) manufacturing system and an associated IC manufacturing flow.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic block diagram of an integrated circuit (IC) manufacturing system 100 and an IC manufacturing flow associated therewith. The IC manufacturing system 100 may benefit from various aspects of the subject matter provided in the present disclosure.

The IC manufacturing system 100 includes a plurality of entities that interact with one another in the design, development, and manufacturing cycles and/or services related to manufacturing an IC device 162. For example, the IC manufacturing system 100 includes a design house 120, a mask house 140, and an IC manufacturer 160 (i.e., a fab). The design house 120, the mask house 140, and the IC manufacturer 160 are connected by a communications network. The communication network may be a single network or a variety of different networks, such as an intranet and the Internet, and may include wired and/or wireless communication channels. Each entity may interact with other entities and may provide services to and/or receive services from the other entities. One or more of the design house 120, mask house 140, and IC manufacturer 160 may be owned by a single larger company, and may even coexist in a common facility and use common resources.

The design house (or design team) 120 generates an IC design layout. The IC design layout includes various geometrical patterns designed for the IC device 162. An exemplary IC design layout may include one or more design blocks. Each design block may include a plurality of patterns designed according to some restricted design rules (RDRs). For example, the patterns may include a mandrel pattern oriented lengthwise along an X direction. The mandrel pattern may have a mandrel width W1. The mandrels are spaced by an edge-to-edge pitch P1 along the Y direction that is orthogonal to the X direction. The various geometrical patterns in the IC design layout may correspond to patterns of metal, oxide, or semiconductor layers that make up various components of the IC device 162 to be fabricated. The various components may include active regions, gate electrodes, metal lines or vias of an interlayer interconnection, and openings for bonding pads, which are to be formed in a semiconductor substrate (such as a silicon wafer) and various material layers disposed on the semiconductor substrate. In one embodiment, the mandrel pattern is used in forming fins for Fin field effect transistor (FinFET) structures.

The design house 120 implements a proper design procedure to form the IC design layout. The design procedure may include logic design, physical design, and/or place and route. The IC design layout from the design house 120 can be presented in one or more data files having information of the geometrical patterns. For example, the IC design layout can be expressed in a GDSII file format, a DFII file format, or another suitable computer-readable data format.

The mask house 140 uses the IC design layout to manufacture one or more masks to be used for fabricating various layers of the IC device 162. The mask house 140 performs mask data preparation 132, mask fabrication 144, and other suitable tasks. The mask data preparation 132 translates the IC design layout into a form that can be physically written by a mask writer. The mask fabrication 144 then fabricates a plurality of masks that are used for patterning a substrate (e.g., a wafer). In the present embodiment, the mask data preparation 132 and mask fabrication 144 are illustrated as separate elements. However, the mask data preparation 132 and mask fabrication 144 can be collectively referred to as mask data preparation.

In the present embodiment, the mask data preparation 132 includes a pattern generating system, which generates pattern layouts in the design layout. For example, the pattern generating system may generate a mandrel pattern layout in a region defined by a boundary in the design layout. For example, the pattern generating system may generate mandrel patterns, such as mandrels for fin structures, within one or more fin boundaries in a design layout. The fin boundaries may be a solid, regular shaped region, such as a solid rectangular region, or a complex region, such as a region with one or more cut outs. Embodiments of the present disclosure provide a method for generating mandrel patterns in various regions, and a computer program implementing the method.

The pattern generating system in the mask data preparation 132 may further prepare other patterns, such as cut pattern layouts to be used in a double patterning process. For example, the mandrel pattern layout defines a mandrel pattern in a first exposure and the cut pattern layout defines a cut pattern in a second exposure. The cut pattern removes unwanted portions of the mandrel pattern, a derivative, or both. The final pattern includes the mandrel pattern plus the derivative but not the cut pattern.

The mask data preparation 132 may further include optical proximity correction (OPC) module. The OPC module uses lithography enhancement techniques to compensate for image errors, such as those that can arise from diffraction, interference, or other process effects. The mask data preparation 132 may further include a mask rule checker (MRC) module. The MRC module checks the IC design layout with a set of mask creation rules which may contain certain geometric and connectivity restrictions to ensure sufficient margins, to account for variability in semiconductor manufacturing processes, etc. The mask data preparation 132 may further include lithography process checking (LPC) module. The LPC module simulates processing that will be implemented by the IC manufacturer 160 to fabricate the IC device 162. The processing parameters may include parameters associated with various processes of the IC manufacturing cycle, parameters associated with tools used for manufacturing the IC, and/or other aspects of the manufacturing process.

It should be understood that the above description of the mask data preparation 132 has been simplified for the purposes of clarity, and data preparation may include additional features such as a logic operation (LOP) module to modify the IC design layout according to manufacturing rules. Additionally, the processes applied to the IC design layout during data preparation 132 may be executed in a variety of different orders.

After mask data preparation 132 and during mask fabrication 134, a mask or a group of masks are fabricated based on the pattern layout. For example, an electron-beam (e-beam) or a mechanism of multiple e-beams is used to form a pattern on a mask (photomask or reticle) based on the pattern layout. The mask can be formed using various technologies to obtain desired function, such as a transmissive mask or a reflective mask. In one embodiment, the mask is formed using binary technology, where a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM.

The IC manufacturer 160, such as a semiconductor foundry, uses the mask (or masks) fabricated by the mask house 140 to fabricate the IC device 162. The IC manufacturer 160 is an IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business.

A semiconductor substrate is fabricated using the mask (or masks) to form the IC device 162. The semiconductor substrate may include a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, and/or other suitable processes.

Figure 2:
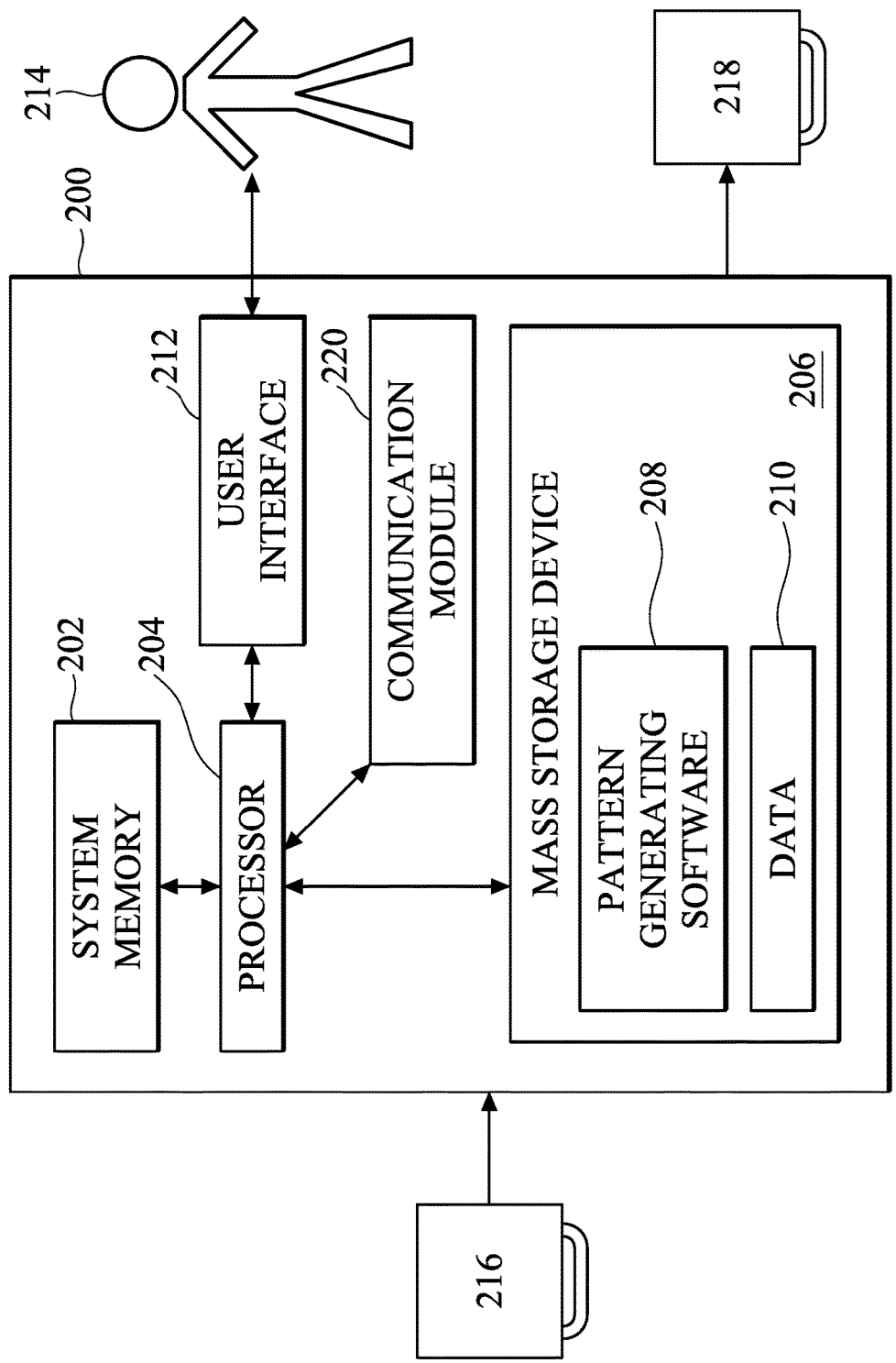
FIG. 2 is a schematic block diagram of a pattern generating system according to one embodiment of the present disclosure.

FIG. 2 is a schematic block diagram of a pattern generating system 200 according to one embodiment of the present disclosure. The pattern generating system 200 may be used for mask data preparation 132 in the mask house 140. The pattern generating system 200 is an information handling system such as a computer, server, workstation, or other suitable device. The pattern generating system 200 includes a processor 204 that is communicatively coupled to a system memory 202, a mass storage device 206, a user interface 212, and a communication module 220.

The system memory 202 provides the processor 204 with non-transitory, computer-readable storage to facilitate execution of computer instructions by the processor. Examples of system memory 206 may include random access memory (RAM) devices such as dynamic RAM (DRAM), synchronous DRAM (SDRAM), solid state memory devices, and/or a variety of other memory devices known in the art.

The communication module 220 is operable to communicate information such as IC design layout files with the other components in the IC manufacturing system 100, such as the design house 120. Examples of communication modules may include Ethernet cards, 802.11 WiFi devices, cellular data radios, and/or other suitable devices.

Computer programs, instructions, and data are stored on the mass storage device 202. Examples of mass storage devices 202 may include hard drives, optical drives, magneto-optical drives, solid-state storage devices, and/or a variety other mass storage devices known in the art.

In one embodiment of the present disclosure, a pattern generating software 208 may be stored in the mass storage device 206. Data 210 for generating patterns using the pattern generating software 208 may also be stored in the mass storage device 206. When executed by the processor 204, the pattern generating software 208 generates pattern layouts from design layouts. The pattern generating software 208 may be an add-on package to an existing electronic design automation (EDA) software, for example CALIBRE from Mentor Graphics, or a standalone software.

Alternatively, the pattern generating software 208 and/or the data 210 may be stored remotely in a server, a remote storage, such as a cloud storage. In on embodiment, the pattern generating system 200 may download the pattern generating software 208 through the communication module 220 during operation. In another embodiment, the pattern generating system 200 may execute the pattern generating software 208 remotely, for example, through a software as a service (SAAS) service.

The user interface 212 allows a user 214, for example a mask design engineer, to interact with the pattern generating system 200. The user 214 may use various tools, such as a keyboard or a mouse to input information into the pattern generating system 200. Various output devices, such as a monitor, may be used to provide information to the user 214.

In operation, the pattern generating system 200 is configured to generate a pattern layout 218 based on a design layout 216. In one embodiment, the mask data preparation 132 is implemented as software instructions executing on the pattern generating system 200.

To further this embodiment, the pattern generating system 200 receives the design layout 216 from the design house 120, and generates one or more pattern layouts 218, for example, a pattern layout including mandrel structures. The pattern layout 218 may be generated by executing the pattern generating software 208. After pattern generation is complete, the pattern generating system 200 transmits the pattern layout 218 to the mask fabrication 134.

In one embodiment, the design layout 216 and the pattern layout 218 may be transmitted in the GDSII file format. In alternative embodiments, the design layout 216 and the pattern layout 218 are transmitted between the components in IC manufacturing system 100 in alternate file formats such as DFII, CIF, OASIS, or any other suitable file type. Further, the pattern generating system 200 and the mask house 140 may include additional and/or different components in alternative embodiments.

FIG. 3 is a schematic flow chart of a method 300 of generating mandrel patterns according to one implementation of the present disclosure. The method 300 may be implemented by the pattern generating software 408 FIG. 4A-4F are schematic plane views of a design block 400 showing a process of mandrel generation using the method 300.

In operation 310 of the method 300, design blocks in a design layout may be parsed to identify design blocks having a line pattern or mandrel pattern after the design layout is received. In one embodiment, identification of a design block having a mandrel pattern may be performed by an electronic design automation software, for example CALIBRE by Mentor Graphics. One or more design blocks may be included in the design layout. A design layout may be in the form of one or more data files having information of geometrical patterns in one or more design blocks for an IC circuit. The design layout file may include information of location and shape of a pattern area for each design blocks, and information of patterns in each design block. In one embodiment, information of the pattern region may be in the form of boundary information.

Figure 4B:
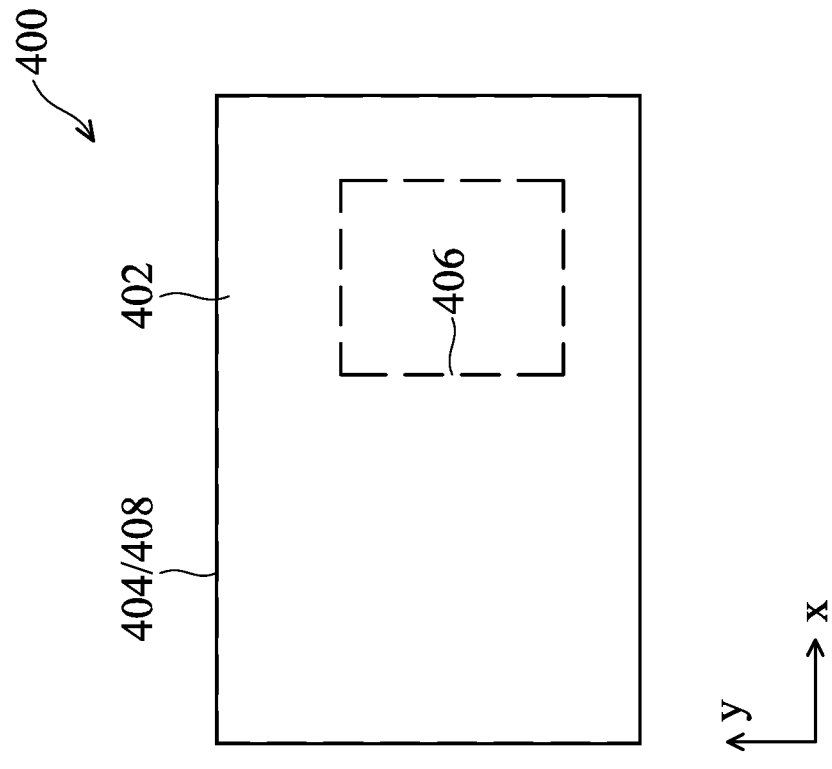
Figure 4A:
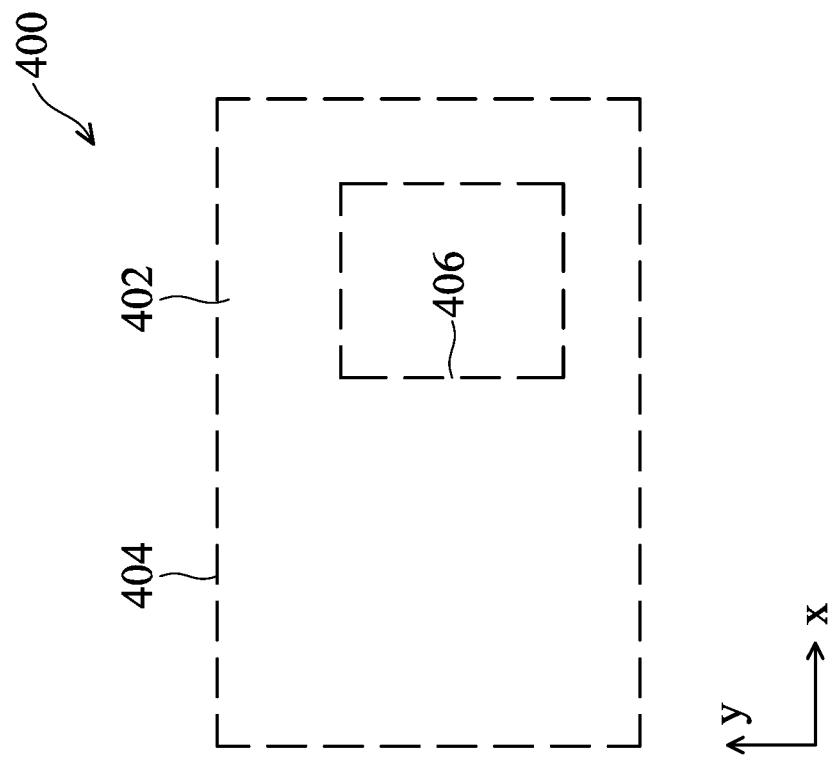

FIG. 4A schematically illustrates an exemplary design block 400 in a design layout. The design block 400 has a pattern region 402 that is provided by boundary information. In the design block 400 shown in FIG. 4A, the pattern region 402 is defined by an outer border 404 and an inner border 406. The pattern region 402 is the area inside the outer border 404 and outside the inner border 406. The outer border 404 encircles the pattern region 402. The inner border 406 defines a hole in the pattern region 402. In some embodiments, the pattern region 402 may include no inner borders. In some embodiments, the patter region 402 includes two or more inner borders 406, each inner border 406 defining a hole in the outer border 404

FIG. 5A includes schematic plane views of design blocks having pattern regions in various shapes. Pattern region 500a includes an area of a solid rectangle without any holes. Boundary information of the pattern region 500a includes only an outer border without any inner border. Pattern region 500b includes a rectangular area having two holes defined by inner borders 502, 504. Pattern region 500c includes a rectangular region having a hole at a corner area defined by an inner border 506.

Referring back to FIG. 4A, the outer border 404 in FIG. 4A is a rectangle having a first edge along the x direction and a second edge along the y direction. Alternatively, the outer border 404 may be of any suitable shape, such as a polygon, a circle, an oval, a compound shape, an irregular shape, or the like. Similarly, the inner border 406 may be of any suitable shape, such as a polygon, a circle, an oval, a compound shape, an irregular shape, or the like.

The design layout file further includes pattern information for each design block. Each design block may include a plurality of patterns designed according to some restricted design rules (RDRs). The various geometrical patterns in the IC design layout may correspond to patterns of metal, oxide, or semiconductor layers that make up various components of the IC device 162 to be fabricated. The various components may include active regions, gate electrodes, metal lines or vias of an interlayer interconnection, and openings for bonding pads, which are to be formed in a semiconductor substrate (such as a silicon wafer) and various material layers disposed on the semiconductor substrate.

In one embodiment, the patterns may include a line pattern or mandrel pattern. In the present disclosure, a line pattern and a mandrel pattern are used interchangeably referring to a pattern of a plurality of parallel lines. In one embodiment, the plurality of parallel lines may have the same line width and disposed at the same line-to-line distance. Alternatively, the plurality of lines may have different line widths and/or different line-to-line distances.

A mandrel pattern may be used in forming various structures in the IC device 162. For example, a mandrel pattern may be used to form fins in an active region to construct fin field effect transistor (FinFET) devices, to form dummy gate structures over the fins in the FinFET devices, to form metal lines in interlayer dielectric layers (ILDs), and any other suitable processes.

In the design block 400, the pattern region 402 may be filled with a mandrel pattern including a plurality of mandrels oriented lengthwise along the x direction. The mandrel pattern information may include a mandrel width value W1 indicating a width of each mandrel in the mandrel pattern. In one embodiment, the mandrel with value W1 may be selected for generating mandrels having a width between about 5 nm and about 27 nm on a substrate. The mandrel pattern information may also include a pitch value P1 indicating a space along the Y direction that is orthogonal to the X direction from edge-to-edge of neighboring mandrels. In one embodiment, the pitch value P1 may be selected to generate mandrels having a pitch value between about 20 nm and about 55 nm in a substrate. In one embodiment, the mandrel pattern is a mandrel pattern used in forming fins in FinFET devices.

In operation 320 of the method 300, a bounding box is constructed to include a pattern region in the identified design block having a mandrel pattern. The bounding box may be constructed according to the boundary information of the pattern region and the pattern information. In one embodiment, a bounding box may be a rectangle enveloping the pattern region, and one edge the rectangle is parallel to the direction of the mandrels in the mandrel pattern. The bounding box may be the smallest rectangle encompassing the pattern region. In one embodiment, the bounding box is identical in shape and location to an outer border of the pattern region. In one embodiment, construction of the bounding box may be performed using commands or instructions in an electronic design automation software, for example CALIBRE by Mentor Graphics. Alternatively, construction of the bounding box may be performed using a dedicated program.

FIG. 4B is a schematic view of the design block 400 showing a bounding box 408 constructed around the pattern region 402. The bounding box 408 is a rectangle identical to the outer border 404. FIG. 5B includes schematic views of pattern regions 500a, 500b, 500c with bounding boxes 508a, 508b, 508c constructed.

In operation 330 of the method 300, leading mandrels are initiated from an edge of the bounding box. The leading mandrels may be placed from either edge of the bounding box that is perpendicular to the direction to the mandrels in the mandrel pattern. The leading mandrels are placed along the edge of the bounding box at a pitch reflecting to the pitch of mandrels in the mandrel pattern. Each leading mandrel may be a polygon, for example a rectangle. In one embodiment, construction of the leading mandrels may be performed using commands or instructions in an electronic design automation software, for example CALIBRE by Mentor Graphics. Alternatively, construction of the leading mandrels may be performed using a dedicated program.

FIG. 4C is a schematic plane view of the design block 400 with a plurality of leading mandrels 412 formed inside the bounding box 408 along a left edge 410. Each of the plurality of leading mandrels 412 may start from the left edge 410 and extends along the x direction (i.e. the direction of the mandrels in the mandrel pattern) in the bounding box 402. The plurality of leading mandrels 412 may be evenly distributed along the left edge 410 at a space 418 apart. The space 418 is the pitch value P1 provided by the mandrel pattern.

A first leading mandrel 412 may be placed at a distance 421 from an edge 421 of the bounding box 408. The edge 421 is orthogonal to the edge 410. In one embodiment, the distance 421 may be between 0 and about the pitch value P1.

Each leading mandrel 412 may be in a suitable shape, for example, a solid polygon, that can be used to construct a mandrel according to the mandrel width value W1 provided by the mandrel pattern. For example, each leading mandrel 412 may be a solid rectangle having a width 416 along the y direction and a length 414 along the x direction. The rectangles corresponding to the leading mandrels 412 are filled to form a mask pattern. The width 416 of the leading mandrel 412 is the mandrel width value W1 provided by the mandrel pattern. The length 414 of the leading mandrels 412 may be arbitrarily selected. In one embodiment, the length 414 of the leading mandrel 412 may be between about half of the pitch value P1 and about two times the pitch value P1.

Alternatively, each leading mandrel 412 can be in other shapes, that may be used by a mask data preparation software to construct a mandrel according to the mandrel width value W1. For example, each leading mandrel 412 may be a circular spot having a diameter corresponding to the mandrel width value W1.

Alternatively, the plurality of leading mandrels 412 may be placed inside the bounding box 408 along an edge 420, which is parallel to the edge 410.

In operation 340 of the method 300, each of the plurality of leading mandrels is extended to a length corresponding to a length corresponding to the length of the bounding box. After extension, each of the plurality of leading mandrels becomes a mandrel/parallel that traverses the bounding box through the entire length of the bounding box. In one embodiment, extension of the leading mandrels in the bounding box may be performed using commands or instructions in an electronic design automation software, for example CALIBRE by Mentor Graphics. Alternatively, extension of the leading mandrels may be performed using a dedicated program.

FIG. 4D is a schematic plane view of the design block 400 showing the plurality of leading mandrels 412 positioned along the left edge 410 to be extended towards the right edge 420 along the x direction to a length 422 corresponding to the length of the bounding box 408. Extending the lending mandrels 412 may be implemented by continuously elongating the leading mandrel rectangle until a right edge of the mandrel rectangle reaches the right edge 430. A mandrel 424 is generated in a band of region having a width of the mandrel width value W1. Alternatively, when the plurality of leading mandrels 412 are placed along the right edge 420, the plurality of leading mandrels 412 may be extended towards the left edge 410 along the x direction to the length 422 corresponding to the length of the bounding box 408.

Figure 4E:
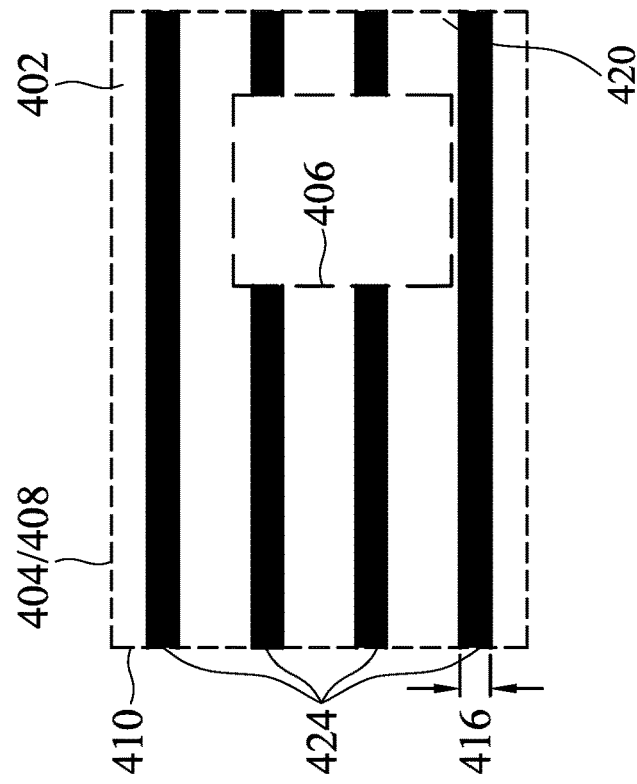

FIG. 4E is a schematic plane view of the design block 400 showing a plurality of mandrels 424 constructed in the bounding box 408 after extending the plurality of leading mandrels 412 across the bounding box 408. The plurality of mandrels 424 are straight lines across the bounding box 408 having a width 416 and arranged at a pitch 418 according to the mandrel pattern. The area excluded by the inner border 406 is also covered by the mandrels 424.

In operation 350 of the method 300, portions of the mandrels inside the inner border of the pattern region are removed and the design block is patterned with the mandrel pattern. In one embodiment, removal of the mandrels from the inner border may be performed using commands or instructions in an electronic design automation software, for example CALIBRE by Mentor Graphics. Alternatively, removal of the mandrels may be performed using a dedicated program.

Figure 4F:
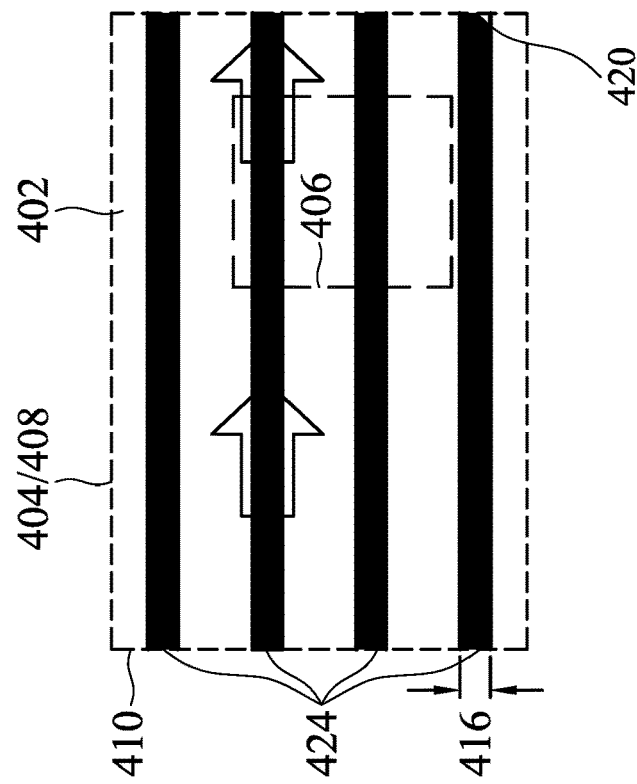

FIG. 4F is a schematic plane view of the design block 400 after portions of the mandrels 424 are removed from the area inside the inner border 406. As shown in FIG. 4F, the mandrel pattern is formed in the pattern region 402 of the design block 400. The mandrel pattern is distributed across the pattern region 402 including all areas around the hole defined by the inner border 406.

Operation 350 may be omitted when generating a mandrel pattern in a design block without any holes or inner borders. FIGS. 6A-6C are schematic plane views of a rectangular design block 600 showing a process generating a mandrel pattern using the method 300. After a design block including a mandrel pattern is identified, a bounding box 608 is constructed around a pattern region 602 according to boundary information provided by the mandrel pattern, as shown in FIG. 6A. The pattern region 602 is a rectangle without any holes. Identifying the design block may be performed using operation 310 of the method 300. Constructing the bounding box 608 may be performed using operation 320. Next operation 330 may be performed to place a plurality of leading mandrels 612 along an edge of the bounding box 608, as shown in FIG. 6B. Operation 340 is then performed to extend the leading mandrels 612 across the bounding box 608 to form mandrels 624 in the pattern region 602, as shown in FIG. 6C. The patterning generating process is completed after the extension because the pattern region 602 does not include any holes.

Traditionally, mandrel patterns or line patterns are generated from a design layout by first forming a plurality of seeds along each line/mandrel, and then extending the seeds until neighboring seeds connect to each other to form a solid line. FIG. 7A is a schematic plane view of a design block 700a with mandrel generated using a traditional method. The design block 700a has a pattern region 702 including a rectangular area in an outer border 704 and excluding holes defined by inner borders 706. Traditionally, a mandrel pattern is generated in the pattern region 702 by placing a plurality of seeds 712 for each mandrel in the pattern region 702. Each seed 712 may have a length 718 along the direction of the mandrel. The seeds 712 may be evenly placed along straight lines corresponding to the mandrels in the mandrel pattern. The seeds 712 are then extended along the straight lines to form mandrels 714.

The length 720 of the seeds 712 and the spacing between the seeds 712 may be selected according to the scale of the pattern. For example, the length 720 of the seeds 712 may be proportional to the pitch of the mandrels in the mandrel pattern. When longer seeds 712 are selected, a shorter time is needed to generate the mandrel pattern. However, when the length 720 is greater than a width of a region in the pattern area 702, for example in regions 716, 718, a seed 712 cannot fit in the regions, resulting in missing mandrel portions in the regions. When shorter seeds 712 are selected, a longer time is needed to generate the mandrel pattern, resulting in low productivity.

Embodiments of the present disclosure provide a method for generating a mandrel pattern with reduced process time and without missing mandrels. FIG. 7B is a schematic plane view of a design block 700b with mandrels generated using a method according to one embodiment of the present disclosure. The mandrels 724 are generated by placing seed mandrels along one side of the outer border 702, extending the seed mandrels across to the opposite side of the outer border 702, and then removing mandrel portions inside the inner borders 706. The resulting design block 700b does not miss any mandrels in regions 714, 716. The process time to generate the mandrel pattern in the design block 700b is also much shorter than the process time to generate the mandrel pattern in the design block 700a.

Various test runs of mandrel generation were performed to compare the traditional method as described in FIG. 7A and the method according to the present disclosure. The test runs are for generating mandrels in active region, for example, for fins in FinFET devices, in 10 nm node fabrication and 5 nm node fabrication. The test runs indicate that the method of the present disclosure reduces runtime for mandrel pattern generation between about 40% and about 80%. For example, it takes about 5 k seconds to generate mandrel patterns in Mask 1 having one device using the traditional method as described in FIG. 7A while it takes about 3 k seconds to generate mandrel patterns in Mask 1 using the method of present disclosure, resulting in about 40% runtime reduction. The test runs also reveal it takes about 10 k seconds to generate mandrel patterns in Mask 2 having 42 devices using the traditional method as described in FIG. 7A while it takes about 2 k seconds to generate mandrel patterns in Mask 2 using the method of present disclosure, resulting in about 80% runtime reduction. The test runs further reveal it takes about 25 k seconds to generate mandrel patterns in Mask 3 having 66 devices using the traditional method as described in FIG. 7A while it takes about 8 k seconds to generate mandrel patterns in Mask 3 using the method of present disclosure, resulting in about 68% runtime reduction.

Embodiments of the present disclosure provide a method of generating mandrel patterns. Compared to traditional methods for mandrel pattern generation, embodiments of the present disclosure avoid missing mandrels in pattern regions with holes. Compared to traditional methods, the method of the present disclosure also greatly reduces process time for generating mandrel patterns. Methods of the present disclosure improve quality and efficiency in mask generation in 10 nm nodes and 5 nm nodes fabrication.

One embodiment of the present disclosure provides a method of generating a mask pattern. The method includes constructing a boundary box according to boundary information of a pattern region, initiating a plurality of leading mandrels inside the boundary box from a first edge of the boundary box, and extending the leading mandrels across the boundary box to a second edge of the boundary box to generate a plurality of mandrels inside the boundary box.

Another embodiment of the present disclosure provides a method for generating a mask. The method include receiving an integrated circuit (IC) design layout, wherein the integrated circuit design layout includes a design block, the design block includes a mandrel pattern in a pattern region, generating a plurality of mandrels in the pattern region including constructing a boundary box enveloping the pattern region, initiating a plurality of leading mandrels along a first edge of the boundary box, and extending the plurality of leading mandrels across the boundary box, and outputting a mandrel pattern layout in a format readable by a mask writer.

Another embodiment of the present disclosure provides a computer system including a processor, and a memory comprising computer readable instructions that when executed by the processor, cause the processor to construct a boundary box according to boundary information of a pattern region, initiate a plurality of leading mandrels inside the boundary box from a first edge of the boundary box, and extend the leading mandrels across the boundary box to a second edge of the boundary box to generate a plurality of mandrels inside the boundary box, wherein the second edge is parallel to the first edge.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a mask pattern, comprising:
    constructing a boundary box according to boundary information of a pattern region;
    initiating a plurality of leading mandrels inside the boundary box from a first edge of the boundary box; and
    extending the leading mandrels across the boundary box to a second edge of the boundary box to generate a plurality of mandrels inside the boundary box,
    wherein the initiating the plurality of leading mandrels comprises constructing a plurality of rectangles, each rectangle of the plurality of rectangles has a length between about 0.5 times and 2.0 times of a pitch value provided by a mandrel pattern.

2. The method of claim 1, wherein the boundary box is a rectangle enveloping the pattern region, and the plurality of mandrels are perpendicular to the first edge.

3. The method of claim 1, further comprising:
    removing portions of the mandrels from a hole in pattern region defined by an inner border.

4. The method of claim 3, wherein the inner border is a rectangle inside the boundary box.

5. The method of claim 1, further comprising, prior to constructing the boundary box, identifying a design block having the pattern region for a mandrel pattern.

6. The method of claim 1, wherein each rectangle of the plurality of rectangles has a width corresponding to a mandrel width provided by the mandrel pattern.

7. A method for generating a mask, comprising:
    receiving an integrated circuit (IC) design layout, wherein the integrated circuit design layout includes a design block, the design block includes a mandrel pattern in a pattern region;
    generating a plurality of mandrels in the pattern region, comprising:
        constructing a boundary box enveloping the pattern region;
        initiating a plurality of leading mandrels along a first edge of the boundary box; and
        extending the plurality of leading mandrels across the boundary box; and
    outputting a mandrel pattern layout in a format readable by a mask writer,
    wherein the initiating the plurality of leading mandrels comprises constructing a plurality of rectangles, each rectangle of the plurality of rectangles has a length between about 0.5 times and 2.0 times of a pitch value provided by the mandrel pattern.

8. The method of claim 7, wherein generating the plurality of mandrels further comprises removing portions of mandrels from a hole in the pattern region defined by an inner border.

9. The method of claim 8, wherein the boundary box is a rectangle.

10. The method of claim 9, wherein the inner border is a rectangle inside the boundary box.

11. The method of claim 7, further comprising identifying the design block including the mandrel pattern.

12. The method of claim 7, wherein the initiating the plurality of leading mandrels comprises constructing the plurality of rectangles along the first edge of the boundary box, each rectangle has a width corresponding to a mandrel width provided by the mandrel pattern.

13. The method of claim 7, wherein the integrated circuit layout includes one of more FinFET devices, and the mandrel pattern including a plurality of mandrels for forming fins in an active region.

14. A computer system comprising:
    a processor; and
    a memory comprising computer readable instructions that when executed by the processor, cause the processor to:
        construct a boundary box according to boundary information of a pattern region;
        initiate a plurality of leading mandrels inside the boundary box from a first edge of the boundary box; and
        extend the leading mandrels across the boundary box to a second edge of the boundary box to generate a plurality of mandrels inside the boundary box, wherein the second edge is parallel to the first edge,
    wherein the initiate the plurality of leading mandrels comprises construct a plurality of rectangles, each rectangle of the plurality of rectangles has a length between about 0.5 times and 2.0 times of a pitch value provided by a mandrel pattern.

15. The system of claim 14, wherein the computer readable instructions further causes the processor to remove portions of the mandrels from a hole in pattern region defined by an inner border.

16. The system of claim 14, wherein the computer readable instructions further causes the processor to, prior to constructing the boundary box, identify a design block having the pattern region for the mandrel pattern.

17. The system of claim 14, wherein the computer readable instructions further causes the processor to generate the plurality of rectangles to initiate the plurality of leading mandrels, each rectangle has a width corresponding to a mandrel width provided by the mandrel pattern.

18. The system of claim 14, wherein the computer readable instructions further causes the processor to receive an integrated circuit (IC) design layout, wherein the integrated circuit design layout includes a design block, the design block includes the mandrel pattern.

19. The system of claim 14, wherein the computer readable instructions further causes the processor to output a mandrel pattern layout in a format readable by a mask writer.

\* \* \* \* \*